United States Patent [19]

Qvarnström

[11] 4,408,549
[45] Oct. 11, 1983

[54] METHOD FOR TRANSPLANTING OF SEEDLINGS

[75] Inventor: Bengt G. L. Qvarnström, Falun, Sweden

[73] Assignee: Stora Kopparbergs Bergslags Aktiebolag, Falun, Sweden

[21] Appl. No.: 267,883

[22] Filed: May 27, 1981

[51] Int. Cl.³ .............................................. A01C 11/02
[52] U.S. Cl. ........................................ 111/2; 47/1 A; 47/58; 414/417
[58] Field of Search .................... 47/1, 1 A, 73, 58; 53/53, 57, 494, 549; 414/404, 417; 111/1-3; 141/94, 231-239

[56] References Cited

U.S. PATENT DOCUMENTS

| | | | |
|---|---|---|---|
| Re. 31,023 | 9/1982 | Hall | 47/1 |
| 3,126,088 | 3/1964 | Dudas | 53/494 X |
| 3,331,532 | 7/1967 | Hori | 47/56 X |
| 3,445,981 | 5/1969 | Hori | 47/56 X |
| 3,674,140 | 7/1972 | File | 53/53 X |
| 3,903,643 | 9/1975 | Blackmore et al. | 47/77 |
| 3,956,869 | 5/1976 | Slathar et al. | 53/53 |
| 3,962,822 | 6/1976 | Walters | 47/74 |
| 4,215,513 | 8/1980 | Dedolph | 47/74 X |

Primary Examiner—James R. Feyrer
Attorney, Agent, or Firm—Jon M. Lewis

[57] ABSTRACT

Disclosed herein is a method and apparatus for mass growing of seedlings in a controlled atmosphere, for later transplanting into a permanent site, e.g. for reforestation. A growing system is disclosed wherein seeds are germinated into seedlings in a growth medium arranged in trays containing compartmentalized recesses or pots all joined together to form a seedling unit. Seedling units in mass growing systems have invariably several pots wherein either the seedlings are dead, or the inserted seeds never germinate; depending on the percentage success of seed germination in the individual pots of each seedling unit, the overall efficiency of utilization of the available room and manpower spent at the growing station is considerably affected. Those pots wherein the seedlings are dead or the seeds have not germinated are identified by automatically scanning the trays; the location of such pots is noted and the pots having no germination nor a usable seedling are emptied automatically and filled with a germinated seedling along with the required growth medium. Having thus ensured that all the pots in all the trays for final stages of growing are occupied by a proper seedling, the efficiency of space utilization is maximized, thereby obviating wastage of manpower, and resulting in increased economy.

13 Claims, 5 Drawing Figures

METHOD FOR TRANSPLANTING OF SEEDLINGS

FIELD OF THE INVENTION

This invention generally relates to improvements in methods of mass growing of seedlings in a greenhouse using pots containing a growth medium, for later replantation at a site; more particularly the invention concerns a method and apparatus for improving the efficiency of space utilization in a greenhouse by automation of detection of pots either having a dead seedling or no seedling, and by automatically replacing a healthy seedling where needed.

BACKGROUND OF THE INVENTION

Mass growing of seedlings is commonly done on a commercial scale in greenhouses, either for resale of seedlings as such or for subsequent replantation in sites chosen for reforestation. It is also common procedure in large-scale farming operations for crops and the like, for germinating and growing seedlings in containers till such time the seedlings are ready for replantation in the field. Invariably, the seedlings are started from seeds inserted into a growth medium and grown in a controlled atmosphere such as a greenhouse till the seedlings reach a desired size. In operations involving large numbers of seedlings, it is expedient to devise arrangements wherein the required facilities are provided in the most economical and the best way possible, at the same time ensuring that the handling and rehandling of the seedlings are curtailed to a minimum.

It is common practice nowadays to have arrangements wherein several seedlings can be germinated and grown in suitable large containers which may have pot-like compartments and which can be handled and taken care of conveniently and transported easily at the time of replanting. A copending application entitled "Seedling Transplant Unit," Ser. No. 231,328 and filed on Feb. 4, 1981, describes the construction of an improved arrangement for a seedling unit, facilitating easy dislodging and removal of root lumps without damage, for transplanting purposes. The seedling unit in said co-pending application is generally in the form of a plurality of pots joined together in the form of a tray-like structure. The pots may be made of a durable quality of plastics, e.g., ABS, or polypropylene or polystyrene. Either the whole seedling unit is formed in one piece or it is made by joining individually produced pots by glueing or welding or fixing into a screen of plastic or metal. This seedling unit is particularly adopted to what is termed "elevated growing".

The seedling units of the type described above are usually filled with a growth medium preferably as described in international patent application PCT/SE 79/00229. Examples of suitable growth media include peat, or mixtures of peat, fibres and/or mull. Seeds are placed in the pots in a known way per se. The seedling units are then placed in an appropriate stand in a greenhouse wherein the underside of the seedling unit is preferably surrounded by air and the required water is supplied from the top only, i.e. elevated growing. By supplying suitable quantities of water and nourishment in the presence of light, the seedlings are allowed to grow to the desired size. Subsequently, the seedling units are transported out into the field or a reforestation area where the seedlings are separated and planted individually. The emptied seedling units are then returned to the greenhouse for re-use.

Statistically, a certain percentage of seeds in every batch does not sprout in time to become seedlings, or, they do not sprout at all. There may be some seedlings which start normally, but dry up too soon either because of malnourishment or because of physical damage. Such occurences are conceivable because, in large-scale seedling operations, feeding of water and nourishment to the trays is usually mechanized, and, a slight misalignment of the feeding or watering mechanism with respect to the trays or the seedling units could result in some seedlings being missed out and/or damaged. There are yet other seedlings which start normally, but are located physically off-center in their respective pots. Such seedlings face the danger of not surviving when transplanted permanently, because of either ill developed roots which cannot support a healthy seedling, or because of the roots undergoing transplant shock owing to their eccentrically being located in the root lump and consequently not having had sufficient protection from the growth medium.

There are also several pots in every batch of seedlings wherein the seeds do not germinate at all; besides such nongerminating pots wasting the watering and nourishment facilities in the greenhouse, they additionally create the necessity of having to deliberately sort them out so as to isolate them before the trays are sent out for field transplantation. If such presorting is not done, and transplantation in the field is done mechanically, the lump of growth medium that is taken out of a nongerminated pot would be wastefully transplanted at an assigned spot which could have been occupied by a healthy seedling; or, if the transplantation in the field is done manually, the chances are that a nongerminated pot in the tray will be left untouched with its hardened growth medium. When the seedling tray is eventually returned to the greenhouse for reuse, the nongerminated pots will have to be necessarily emptied preferably manually before the trays can again be filled with fresh growth medium before seeding.

While the problems caused by seedlings that have grown completely off center in a pot is a lesser problem, the matter of nongerminating. seeds poses problems which require serious consideration. The costs incurred in the greenhouse maintenance and upkeep which comprise labor, cost of running the mechanized equipment, cost of plant food as well as the cost of the growth medium have to be applied to only the seedlings that can be turned out with success; a large percentage of nongerminating seeds in pots, and a significant reject rate in seedlings either because they are too much off center or because they have prematurely dried would drive up the total operating costs and would result in a very uneconomical use of the greenhouse facilities. The problem of seeds not germinating at all totally, has been partly solved by inserted more than one seed in a pot, say two seeds. The germinating rate of seeds depends among other things on the quality of the seeds, the plant species and to some extent on the external conditions. For some known species of trees, the germination rate is so notoriously poor that a drop out of up to 40% is not uncommon. However, even though the probability of positively having a seedling in each pot is increased by inserting more than one seed in each pot, there will be several pots where more than one seedling will result. At some stage of seedling growth in the greenhouse, or as a last resort in the field during transplantation, multiple seedlings will have to be separated from the pots which are sorted out. This again results in more manual intervention and higher costs.

There has therefore been a need for obviating the foregoing problems to result in profitably exploiting the expensive space available in greenhouses for mass-scale commercial growing of seedlings. It is important to ensure that as few pots as possible are rejects or vacant, at a juncture as soon as possible after the germinating of the seeds. The present invention provides an apparatus and a method which enable optimally the best possible utilization of the greenhouse facilities with minimal waste and the maximum number of acceptable seedlings, regardless of the plant species or the quality of the seeds. The apparatus and method of the invention enable to reduce the need for manual intervention in wasteless mass-growing of seedlings to a minimum, thereby resulting in increased economy. By the present invention in mass-growing of seedlings, as soon as possible after the germination of seeds, the trays are scanned to identify the pot locations not containing a seedling; in the exact desired locations healthy seedlings together with their root lumps are automatically placed after first emptying the pots of the old growth medium in which the seeds did not germinate. The diagnosis of the pots to be gone through to replace the faulty seedlings is done automatically too, according to the present invention. In an exemplary embodiment of the invention which uses conveyors, the seedlings trays according to the pending U.S. application Ser. No. 231,328 filed on Feb. 4, 1981, referred to supra, by virtue of each seedling pot comprising a plurality of finger-like openings depending from the pot top opening, it is expedient to empty the contents of a pot by displacing the contents downwards; it is equally expedient to insert a replacement seedling along with its root lump, by insertion from the top. Other methods of evacuation of pots and inserting replacement seedlings are within the purview of this invention and can be detailed as the constructional features of the seedling unit dictate.

The invention in its broad form resides in an apparatus for use in mass-growing of seedlings in a greenhouse for automatically handling seedling units comprising pots to examine if each pot has an acceptable seedling and for automatically inserting a replacement seedling into any pot which needs a replacement seedling, the apparatus comprising:

first means to scan the pots automatically to identify and note pot locations which need a replacement seedling;

control means responsive to the first means to automatically cause evacuation of identified pots; and seedling inserting means responsive to the control means to automatically insert a replacement seedling in each of the evacuated pots, whereby with all the scanned pots having acceptable seedlings, the utilization of the greenhouse space is improved.

The invention also consists in a method for mass-growing of seedlings in a greenhouse using seedling units of the type having a plurality of pots joined together in side-by-side relationship in an array to form a tray-like structure, where each pot is bottomless and comprises a plurality of resilient strips extending from the pot opening to converge towards the pot bottom side, the strips in use being rigid enough to hold and retain in use a lump of growth medium to support a seedling therein, the method being for automatically inserting healthy seedlings together with growth medium in pots where seeds inserted into the growth medium did not germinate, said method comprising the steps of:

scanning the array of pots in each tray aided by a control unit, to identify the locations of pots wherein an acceptable seedling is absent;

automatically emptying the pot contents from said locations by using information regarding the identified locations; and automatically inserting replacement seedlings with lumps of growth medium in emptied pot locations by taking replacement seedlings from a replacement seedling tray, whereby with the processed seedling units all having acceptable seedlings and no pots with ungerminated seeds, the utilization of the greenhouse space is improved.

BRIEF DESCRIPTION OF DRAWING

The various features and advantages of the invention will be apparent from the following description of preferred embodiment described in conjunction with the accompanying drawing wherein.

DESCRIPTION OF PREFERRED EMBODIMENT

Figure 1:
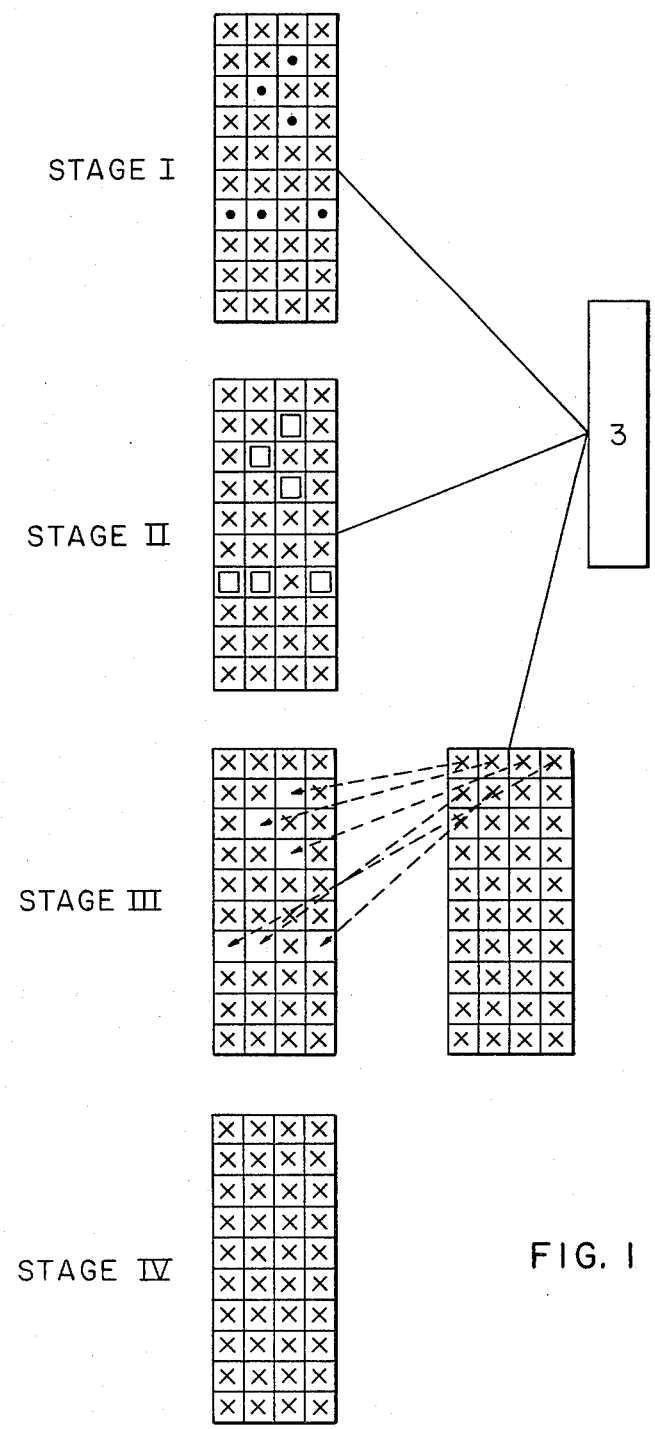
FIG. 1 shows a schematic illustration of how pots in trays are scanned to identify the locations of pots which need a replacement seedling.

In the exemplary embodiment described hereinafter, pots are generally illustrated and described as ganged together substantially in the form of a tray comprising a plurality of pots joined in side-by-side relationship. The invention is equally applicable for other arrangements of pots as well. With particular reference to FIG. 1, Box 3 is intended to represent a control and identifying means which scans all the pots in each tray as in Stage I. The pot tray diagrammatically illustrated in Stage I of FIG. 1 contains healthy seedlings and pots where there is no healthy seedling. Of the second category, most are pots wherein the seeds did not germinate, and the rest may be seedlings which did not develop or which dried prematurely.

For purposes of scanning the tray of Stage I, any of the methods including optical scanning by a light beam or scanning by an infrared detector or by an ultrasonic detector, or a capacitance detector can be used. The theory and principles used in the methods of detection by scanning do not form part of this invention and are not dealt with herein in detail. Any publication or text on the appropriate method of scanning would provide enough background and know-how regarding the principle and theory used in the method of the present invention.

As illustrated in FIG. 1, the locations of pots wherein a healthy and acceptable seedling has developed are marked by an "X," whereas the pot locations where a healthy seedling needs inserted is marked by a dot. The pot locations identified by a dot are noted by the control 3 and are caused to be emptied as shown in Stage II. A replacement supply tray is lined up proximate to the scanned tray as shown in Stage III, and, from the replacement supply tray seedlings with their root lumps are transferred to the empty pots which were emptied in Stage II. After all the empty pots are filled, the tray would look as illustrated in Stage IV, which if scanned would indicate all pots full and occupied by acceptable seedlings. Thus, a tray which has been scanned and taken care of with respect to any required replacements does not need to be included or scheduled for manual sorting or inspection.

Figure 2:
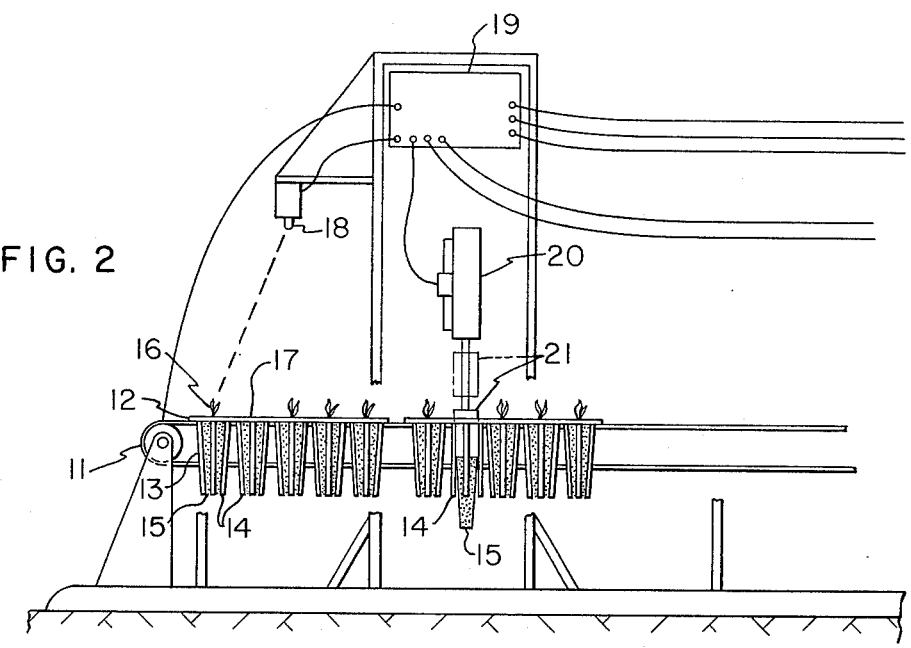
FIG. 2 shows a schematic of an arrangement to automatically and mechanically empty a pot which has been identified and which needs a replacement seedling.
Figure 3:
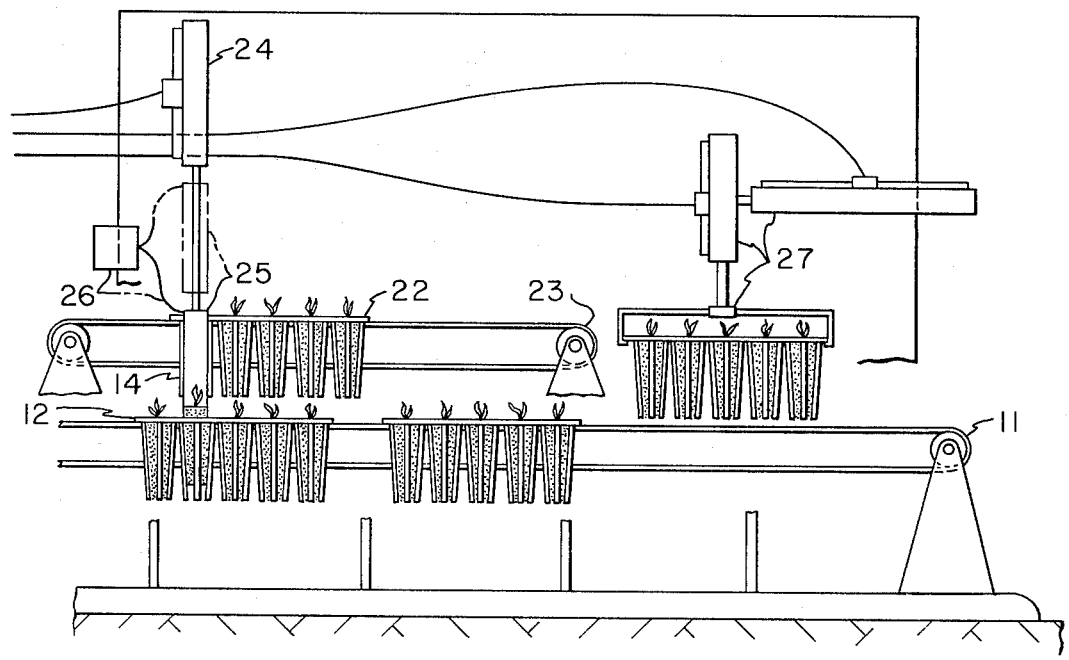
FIG. 3 shows a schematic of an arrangement which illustrates how a replacement seedling is inserted.

FIGS. 2 and 3 generally illustrate in a diagrammatic manner trays being handled on conveyors with facilities for downwardly emptying any desired pot by downward ejection of a seedling lump, and provided with facilities for inserting a replacement seedling into a pot from the top. As aforesaid, such methods of emptying the pots and seedling replacement are convenient for the particular structural arrangement of the pot tray as in the aforesaid pending U.S. application. Said pending U.S. application describes seedling trays 12 as shown in FIGS. 2 and 3, comprising resilient strips 14 which converge downwardly from the opening of each pot so as to be able to retain growth medium 15 without additional structural assistance. However, the converging strips can be resiliently deformed by the action of a plunger 21 as shown in FIG. 2 so as to empty the pot to dislodge the unwanted lump 15 of growth medium containing a nongerminated seed.

With particular reference to FIG. 2, a conveyor 11 is provided with facilities to handle seedling units or trays 12 consisting of a plurality of pots 13 each of which consists of downwardly convergent resilient strips 14. Growth medium 15 is contained in each pot, preferably filled as described in U.S. patent application No. 198,942 filed July 3, 1980. (Swedish patent application 7811523-5) Healthy seedlings 16 are recognized by an overhead scanner 18 which also takes note of pots 17 where germination did not take place. The scanner 18 could include sensors of any suitable type depending upon the type of scanning employed, optical, infrared or capacitive, etc.; a suitable form of record is provided to note and identify the location of the pots 17. As known to people who are skilled in the art, the means to note and identify the locations of pots 17 could comprise, for example, a latching relay bank which may use magnetic means or groups of two opposing coils. As aforesaid, the present invention is not primarily directed to the minute details of the mechanism of noting and identifying the locations of 17, since such minor details of such arrangements can be derived from prior art and are not dwelt on herein.

Having recorded the locations of the pots 17, the apparatus next actuates an ejector device 20 under which the scanned tray passes. The ejector device contains one or more plungers 21 which when actuated downwardly, resiliently deflect the strips 14 and ejects the growth medium 15 from the pots 17. The medium 15 in the form of lumps is dislodged and can be taken away if necessary for reuse.

The control means can be so set and the scanner 18 can be so adjusted as to its threshold operating level that seedlings which are eccentric or dead in their pots can also be discarded. Optical scanners are well known in the art, and ample information is available from published literature.

At the next step the seedling unit is moved in under a second seedling unit 22. This is placed on a higher situated conveyor, that may be moved both longitudinally and laterally. The mechanism for the lateral movement is not shown in the figure. The seedling units are adjusted so that a filled pot with a replacement seedling in the elevated unit is situated above an emptied pot in the seedling unit below and at the same time below a line of transfer devices 24 equipped with sockets 25 for pressing down growth medium with seedling. The sockets 25 fit substantially precisely inside the walls of the pot and are shaped suitably as not to damage the seedlings; the ribs 14 of the under part of the pot are resiliently pressed apart when the socket is moved down, and the lump of growth medium together with the seedling goes with the socket and is guided into the lower pot 13. When the socket is moved up again, preferably, compressed air is admitted using the unit 26 in order to loosen the socket from the growth medium. Periodically and at a suitable juncture, seedling trays may be lifted by a hoist 27 from the lower conveyor to the upper conveyor and used for filling the blank spots in the arriving seedling units on the lower conveyor. When a seedling unit on the upper conveyor is empty it is moved away from the upper conveyor. All mechanisms are connected to the control means 19 and work according to instructions from the control means.

Figure 4:
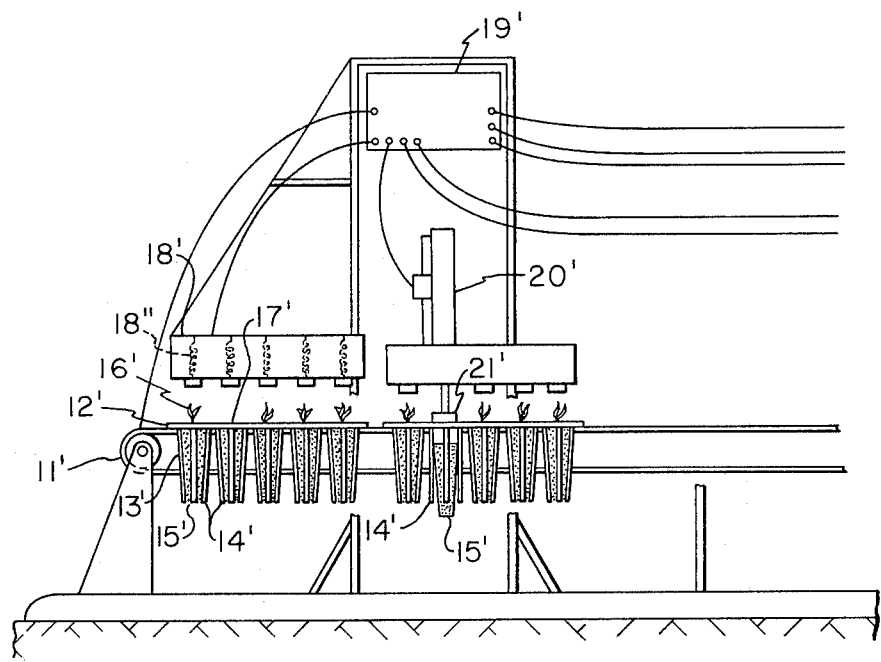
FIGS. 4 and 5 illustrate diagrammatically a modification of the apparatus of FIGS. 2 and 3.
Figure 5:
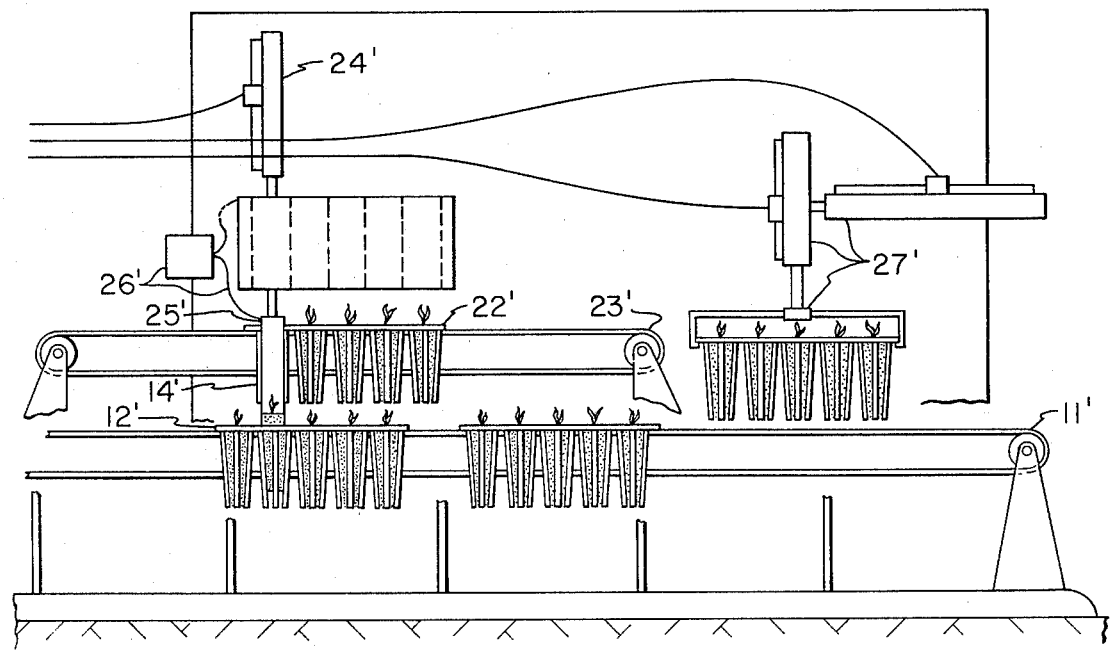

A modification of the invention is illustrated schematically in FIGS. 4 and 5, wherein the construction and functional elements are largely similar to the counterparts of the embodiment of FIGS. 2 and 3, except that the scanner, the plunger mechanism and the socket unit (to eject replacement seedlings into the evacuated pots) are provided in separate arrays instead of a single scanner unit, a single plunger and a single socket respectly. Like numerals have been used with a prime in FIGS. 4 and 5 to identify corresponding elements.

The sensor 18' comprises, for example, a plurality of capacitance sensing units (or other type) which may work in conjunction with a latching relay bank. Each latching relay unit would register information corresponding to a single pot in the seedling tray being scanned, and there are as many individual sensing units as there are pots in a tray. Each latching relay unit may comprise, for example, a set of opposing coils; alternatively the latching relay unit may be a magnetic type. Prior art is replete with latching type relay units and it is considered redundant to dwell at length regarding the details of circuit arrangements which are taught by published text books and literature. One who is skilled in the art would easily be able to make a suitable design choice regarding the type of latching relay unit which would suit the individual requirement.

The important advantage offered by the modification illustrated in FIGS. 4 and 5 is that there will be no need for the sensor 18' either to travel or make any kind of movement in order to get a complete overview of all the pots, thereby simplifying the entire sensor mechanism and saving the scanning time which the single sensor unit would need to cover all the pots in a single seedling unit 12'. The advantage is especially significant if the seedling unit 12' is particularly large, and the sensor unit or scanner 18 (of FIG. 2) would need a long time to scan all the pots; moreover, with an overly large seedling tray and a single scanner unit 18 the diagnosis for pots in the periphery of the seedling trays may not be wholly reliable. Likewise, the time needed for evacuating the identified nongerminating pots 17 if there were a single plunger 21 (FIG. 2) can be substantially reduced with the gang-plunger arrangement illustrated in FIG. 3. Once the location of the nongerminated pots 17 has been identified, the gang-plunger unit 21' can be aligned with the scanned seedling tray, and all the selected plunger units operated simultaneously. The same considerations apply to the socket mechanism 25' in FIG. 5. The substantial time saving in finishing the scanning operations will be a critical factor contributing to productivity when several hundred thousands of seedlings are to be processed.

Other alternative methods of emptying the sockets 17, such as pneumatically blowing or sucking the growth medium are within the purview of this invention. Likewise, other methods of insertion of a healthy seedling into an empty pot, other than ejecting the seedling root lump from a pot situated above are also within the scope of this invention. The particular details of the method of evacuation and seedling replacement is largely governed by the seedling unit construction, and partly by design choice.

It is seen from the above that trays 12 which are filled where the replacements were needed are complete and can be put back in the greenhouse environment for final growth stages. Since seedling trays 12 have all the pots therein occupied by acceptable, useful seedlings, any further greenhouse facility allocated to such trays, as well as any further labor spent on them such as in handling and transportation and replanting will return in maximal returns unlike with trays which were never treated according to the invention.

What is claimed is:

1. In mass-growing of seedlings in a greenhouse using seedling units of the type having a plurality of pots joined together in side-by-side relationship in an array to form a tray-like structure, where each pot is bottomless and comprises a plurality of resilient strips extending from the pot opening to converge towards the pot bottom side, the strips in use being rigid enough to hold and retain in use a lump of growth medium to support a seedling therein, a method of automatically inserting healthy seedlings together with growth medium into pots where seeds previously inserted into the growth medium did not germinate, said method comprising the steps of:

scanning the array of pots in each tray aided by a control unit, to identify the locations of pots wherein an acceptable seedling is absent;

automatically emptying the pot contents from said locations by using information regarding the identified locations; and automatically inserting replacement seedlings with lumps of growth medium in emptied pot locations by taking replacement seedlings from a replacement seedling tray, whereby with the processed seedling units all having acceptable seedlings and no pots with ungerminated seeds, the utilization of the greenhouse space is improved.

2. A method as in claim 1 wherein the step of scanning is performed by optical scanning.

3. A method as in claim 1, wherein the step of scanning is performed by capacitance scanning.

4. A method as in claim 1 wherein the step of scanning is performed by ultrasonic scanning.

5. A method as in claim 1 wherein the step of scanning is performed by infrared scanning.

6. A method as in claim 1 wherein the step of automatically emptying the pot contents comprises pneumatically emptying the pot contents.

7. A method as in claim 1 wherein the step of automatically emptying the pot contents comprises mechanically emptying the pot contents by causing a plunger move downwardly into a selected pot through control of said control unit, to empty the pot through its bottom side.

8. A method as in claim 7 including the step of arranging seedling units to be scanned on a conveyor, whereby the seedling units are scanned as they pass on the conveyor.

9. A method as in claim 8 wherein the step of automatically inserting a replacement seedling includes utilizing a seedling from a replacement seedling unit tray disposed on a second conveyor which is located vertically above said first conveyor.

10. A method as in claim 9 including the step of using a socket which is made to move downwardly to dislodge a replacement seedling from a replacement seedling unit tray into an evacuated pot vertically below on the first conveyor.

11. A method as in claim 10 including the step of hoisting an unscanned seedling unit tray from the first conveyor upwardly to the second conveyor, responsive to the control unit.

12. A method as in claim 10 including the step of admitting compressed air into the socket when it is moved up, so as to facilitate dislodging growth medium from the socket into an evacuated pot which is part of a seedling unit tray on the first conveyor.

13. A method as in claim 12 including the step of moving a seedling unit tray away from the second conveyor when such seedling unit tray is empty and has no more replacement seedlings.

* * * * *

UNITED STATES PATENT AND TRADEMARK OFFICE
CERTIFICATE OF CORRECTION

PATENT NO. : 4,408,549
DATED : October 11, 1983
INVENTOR(S) : Bengt G. L. Qvarnstrom It is certified that error appears in the above-identified patent and that said Letters Patent is hereby corrected as shown below:

On the title page the following should be added

--- [30] Foreign Application Priority Data

June 13, 1980    Sweden......8004415 ---.

Signed and Sealed this

Third Day of July 1984

[SEAL]

Attest:

GERALD J. MOSSINGHOFF

Attesting Officer    Commissioner of Patents and Trademarks